Sept. 22, 1953     N. H. SAILER     2,653,257
LOW INERTIA TYPE DRAG CUP MOTOR
Filed March 22, 1952
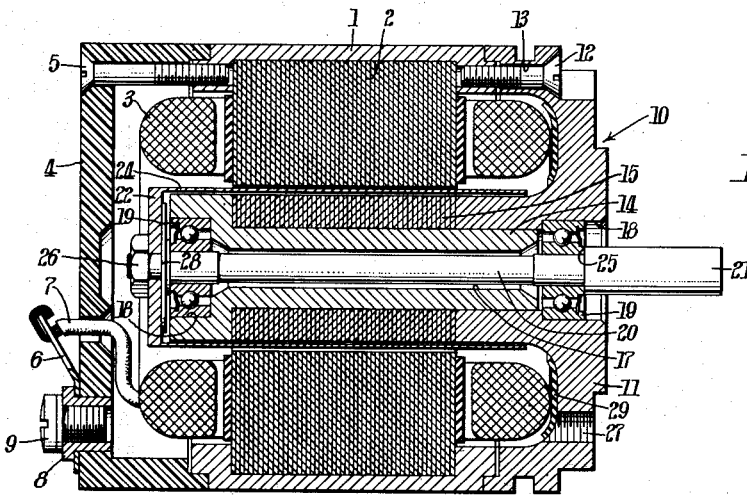
*Fig.1.*
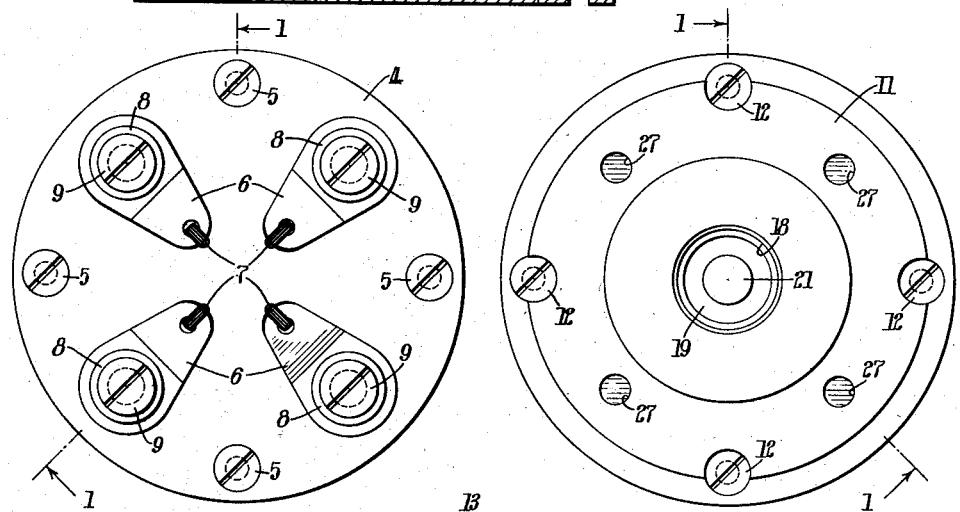
*Fig.2.*     *Fig.3.*
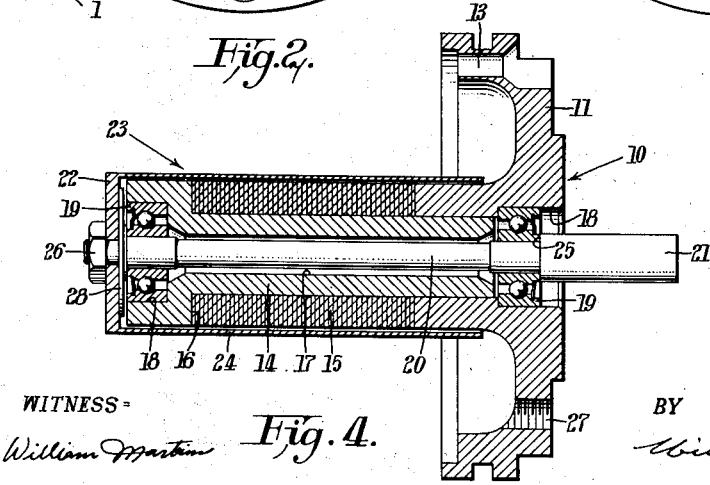
*Fig.4.*
WITNESS:
William Martin
INVENTOR.
Norris H. Sailer
BY
William P. Stewart
ATTORNEY Patented Sept. 22, 1953

2,653,257

UNITED STATES PATENT OFFICE 2,653,257

LOW INERTIA TYPE DRAG CUP MOTOR

Norris Hamptom Sailer, Union, N. J., assignor to The Singer Manufacturing Company, Elizabeth, N. J., a corporation of New Jersey Application March 22, 1952, Serial No. 277,925

2 Claims. (Cl. 310—166)

The present invention relates to electric motors or generators and has for an object to provide an improved motor or generator of the low inertia, drag cup type.

More specifically, it is an object of the present invention to provide such a motor or generator in which the rotor is formed as an element of a subassembly which facilitates motor assembly and thus reduces the cost thereof.

It is a further object of the present invention to provide such a device in which the electrical characteristics are enhanced, while at the same time facilitating the assembly problems involved.

Having in mind these and other objects that will be evident from an understanding of this disclosure, a presently preferred embodiment of the invention is hereinafter set forth in such detail as to enable those skilled in the art to readily understand the function, construction, operation and advantages of it when read in conjunction with the accompanying drawings in which:

Fig. 1 is a sectional view taken substantially along the line 1—1 of Figs. 2 and 3 of a motor embodying the principles of the present invention.

Figs. 2 and 3 are opposite end views of the motor illustrated in Fig. 1.

Fig. 4 is a sectional view of the rotor subassembly per se substantially as illustrated in Fig. 1.

Although herein referred to as a motor, it will be obvious to those skilled in the art that the term is used merely for convenience since the device may obviously be used as either a motor or a generator. Thus, it should be borne in mind that the term "motor" as used herein is intended to be generic to include both a motor and generator.

As illustrated in the drawing, the motor, which in the present case is of the two-phase induction type, is enclosed within a cylindrical die-cast outer casing 1. A conventional stator 2 formed of magnetic laminations and having a central apertured portion is fitted within the casing and, in the usual manner, includes longitudinal slots (not shown) through which the current-carrying wires of a stator winding 3 are threaded. Closing the one end of the casing 1 is an end cap 4 formed of a non-conducting material such as plastic or fibre and secured to the casing by four screws or through-bolts 5 that extend through suitable apertures formed in the end cap and are threaded into the casing. Connectors 6 which include a base portion that lies flat against the end cap 4 and a carrier portion diverging from the end cap are adapted to support and make contact with the ends of lead wires 7 which extend through suitable apertures in the end cap 4 and are connected to the stator winding 3. The connectors 6 are each secured to the end cap 4 by a shouldered plug 8 of conducting material internally threaded to receive a screw 9 adapted to secure the power input lines (not shown) thereto. Since the illustrated motor is of the two-phase type, there are shown four of the lead wires 7 and associated connecting means. The plugs 8 may be secured in place by any suitable means.

The rotor of the present motor is formed as an element of a subassembly, generally indicated at 10 and illustrated per se in Fig. 4, which includes a die-cast end cap 11 for the casing 1, opposed to the end cap 4 and secured to the casing by screws or through-bolts 12 that extend through suitable apertures 13 formed in the end cap 11 and are threaded into the casing as shown in Fig. 1. The end cap 11 has a tubular hub portion adapted to receive a force-fitted sleeve or stud 14 that is surrounded by the stacked annular laminations which form an inner stator element 15 about which the rotor rotates. The laminations 15 are confined between the inner face of the hub of the end cap 11 and a shoulder 16 on the stud 14. The end cap 11 is provided with tapped holes 27 adapted to receive screws or other means to secure the motor to a bracket or other support. An annular insulation piece 29 is placed between the end cap 11 and the end turns of the winding 3 as a precaution against accidental electrical connection between winding and casing with its associated shock hazard.

When assembled, the stud 14 and end cap 11 comprise, in effect, a unitary rotor supporting structure which is provided with a shaft-receiving bore 17 having countersunk ends 18 that receive ball bearings 19. A shaft 20 is fitted into the bore 17 and journaled in the bearings 19. The one end of the shaft projects exteriorly of the end cap 11 to provide a power take-off portion 21 and the opposite end is reduced to extend through an aperture formed in the disc-like head 22 of a cup rotor 23 that also includes a cylindrical shell portion 24 positioned for rotation in the annular air-gap between the stator elements 2 and 15 as seen in Fig. 1.

The rotor 23 is preferably formed from commercially pure aluminum by the well-known process of impact extrusion. This mode of construction is very efficient from the standpoint of minimizing machining waste, and the cold working of the material develops substantially the full-hard properties of aluminum, making the rotor strong, rigid, and dimensionally stable thus better to maintain the very small air gap clearance required in motors of this type. The shaft 20 is provided with a shoulder 25 at the inner end of the power take-off portion 21 that engages the inner racering of the adjacent bearing 18. At its opposite end, the shaft 20 is threaded to receive a nut 26. Washers or shims 28 are placed between the head 22 of the rotor-cup and the shoulder between the shaft and the reduced outer portion thereof, and the head and the shims are clamped between the shoulder and the nut 26, thus locking the head 22 of the rotor to the shaft 20 for rotation therewith. The end-play of the shaft 20 can be adjusted by varying the size or number of the shims 28.

It should be noted that the shell 24 of the rotor, as is conventional in this type of motor, is made as thin as possible consistent with the required strength, in order to decrease the inertia thereof to a minimum. Also the air gap is made as small as possible to obtain maximum torque, but should not be made so small as to require critical assembly to avoid damaging interference between the rotor and stator elements. The improvements of the present invention enhance both these desired conditions. The rotor shaft 20 is journaled in two widely spaced and well supported bearings 18 which add rigidity to the rotor and thus permit a thinner rotor cup, and a smaller air gap than could otherwise be used. From an assembly standpoint, the air gap between the rotor and the stator element 15 can be reduced to an absolute minimum because the parts are assembled as a separate unit at which time all the elements are readily accessible for manipulation or adjustment and inspection. Thus any misalignment or incorrect fits between the parts which would cause damaging interference between the rotor 23 and the stator element 15 can be readily detected and corrected. This opportunity for inspection while the elements are only in a subassembled condition also reduces the number of rejects which normally would not be discovered until the final assembly when correction would be more difficult and reassembly more costly. Finally, the alignment of the rotor 23 with respect to the stator 2 is facilitated since it depends only upon the placing of a single unit within a single bore. The rotor is rigidly supported by two widely spaced bearings located in a single stationary element.

The advantages derived from the purely mechanical aspects of assembling the motor are believed to be self-evident and it is not deemed necessary to recite them individually.

Numerous alterations of the structure herein disclosed and modified embodiments of the present invention will suggest themselves to those skilled in the art. However, it is to be understood that the present disclosure relates to a preferred embodiment of the invention which is for purposes of illustration only and not to be construed as a limitation thereof. All modifications which do not depart from the spirit of the invention are intended to be included within the scope of the appended claims.

Having thus set forth the nature of the invention, what I claim herein is:

1. In an electric motor, a casing, a first stator element having a central apertured portion and fixed in said casing, and a unitary assembly comprising a supporting structure including an end cap adapted to be releasably secured to the casing and a stud extending from and substantially normal to the end cap, said stud terminating in a free end and being adapted to be fitted within the apertured portion of said first stator element, said stud and end cap being provided with a longitudinal through bore, a shaft journaled in spaced bearings within the bore, a second stator element surrounding and carried by the stud, and a cup-shaped rotor having a head portion and a shell portion, said head portion being secured to said shaft adjacent the free end of said stud and said shell portion surrounding said stud and second stator element and being positioned in spaced relation with respect to both said stator elements when in assembled condition.

2. A device in accordance with claim 1 in which said cup-shaped rotor is formed of aluminum by cold impact extrusion.

NORRIS HAMPTOM SAILER.

References Cited in the file of this patent

UNITED STATES PATENTS

| Number | Name | Date |
|---|---|---|
| 1,094,388 | Howe | Apr. 21, 1914 |
| 1,310,626 | Lewis | July 22, 1919 |
| 2,361,790 | Noxon | Oct. 31, 1944 |
| 2,581,093 | Gille | Jan. 1, 1952 |

FOREIGN PATENTS

| Number | Country | Date |
|---|---|---|
| 852,367 | France | Oct. 23, 1939 |